(12) United States Patent
Ross

(10) Patent No.: US 7,579,705 B1
(45) Date of Patent: Aug. 25, 2009

(54) SYSTEM AND METHOD FOR GENERATING ELECTRICAL ENERGY USING A FLOATING DOCK

(76) Inventor: Anthony C. Ross, 3456 Maybank Hwy., John's Island, SC (US) 29455

( * ) Notice: Subject to any disclaimer, the term of this patent is extended or adjusted under 35 U.S.C. 154(b) by 0 days.

(21) Appl. No.: 11/973,269

(22) Filed: Oct. 4, 2007

Related U.S. Application Data

(60) Provisional application No. 60/849,420, filed on Oct. 4, 2006.

(51) Int. Cl.
*F03B 13/10* (2006.01)
(52) U.S. Cl. .............. 290/53; 290/54; 290/55
(58) Field of Classification Search ............ 290/53, 290/54, 55
See application file for complete search history.

(56) References Cited

U.S. PATENT DOCUMENTS

| | | | |
|---|---|---|---|
| 4,009,395 A | 2/1977 | Long et al. | |
| 4,228,360 A | 10/1980 | Navarro | |
| 4,284,901 A | 8/1981 | Giguere | |
| 4,392,060 A | 7/1983 | Ivy | |
| 4,418,286 A | 11/1983 | Scott | |
| 4,560,884 A | 12/1985 | Whittecar | |
| 4,610,140 A | 9/1986 | Thompson | |
| 4,612,768 A | 9/1986 | Thompson | |
| 4,931,662 A * | 6/1990 | Burton | 290/42 |
| 6,216,455 B1 | 4/2001 | Doleh et al. | |
| 6,269,636 B1 * | 8/2001 | Hatzilakos | 60/398 |
| 6,574,957 B2 | 6/2003 | Brumfield | |
| 6,717,284 B2 | 4/2004 | Lin | |
| 6,812,588 B1 | 11/2004 | Zadig | |
| 6,864,592 B1 | 3/2005 | Kelly | |
| 6,933,623 B2 * | 8/2005 | Carroll et al. | 290/42 |
| 7,011,501 B2 * | 3/2006 | Lindberg | 416/84 |
| 7,012,340 B2 | 3/2006 | Yi | |
| 7,131,269 B2 | 11/2006 | Koivusaari | |
| 7,365,445 B2 | 4/2008 | Burcik | |
| 7,432,612 B2 * | 10/2008 | Lomerson et al. | 290/53 |
| 2002/0067043 A1 | 6/2002 | Ovadia | |

* cited by examiner

*Primary Examiner*—Nicholas Ponomarenko
*Assistant Examiner*—Iraj A Mohandesi

(57) ABSTRACT

A system for converting mechanical wave energy into electrical energy comprising a translating generator apparatus located on a floating dock.

20 Claims, 14 Drawing Sheets

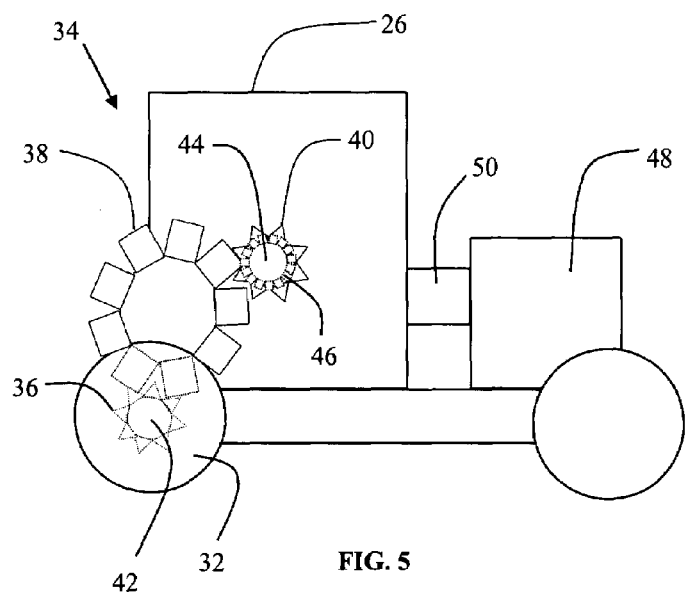
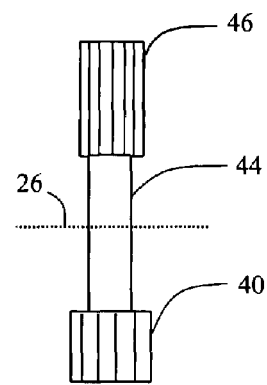
FIG. 5
FIG. 6
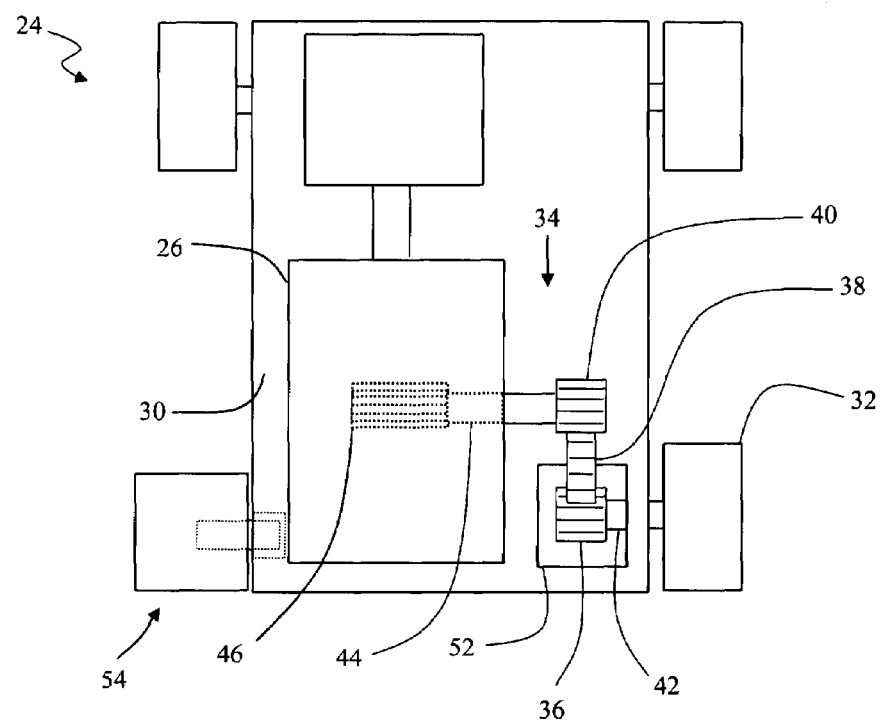
FIG. 7

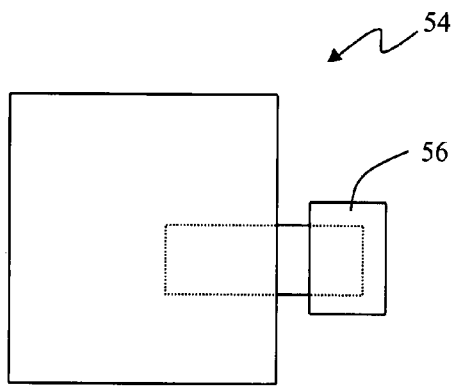
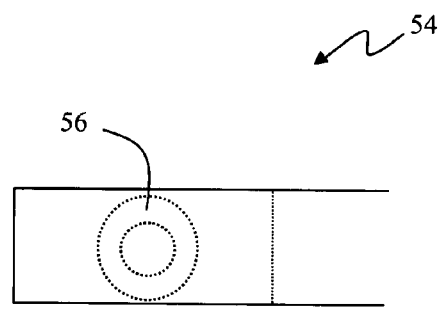
FIG. 8  FIG. 9
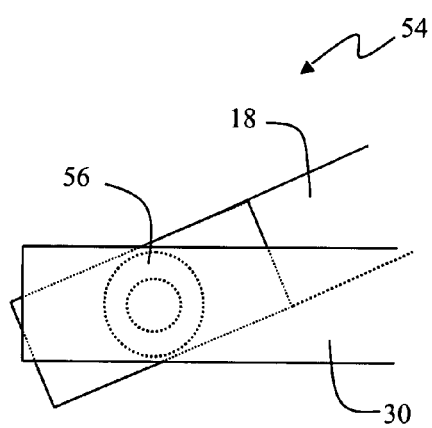
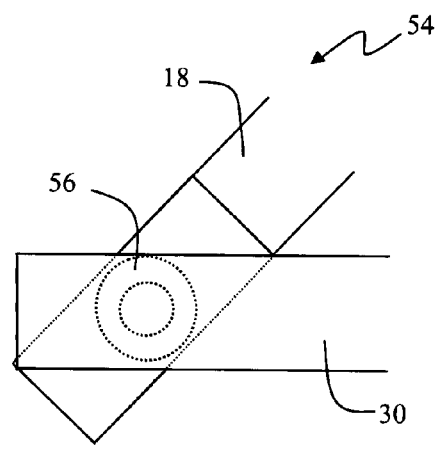
FIG. 10  FIG. 11

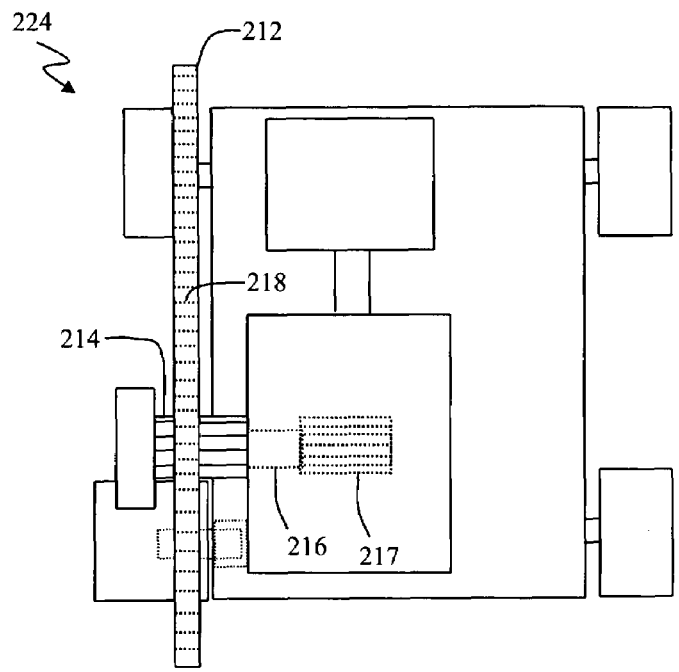
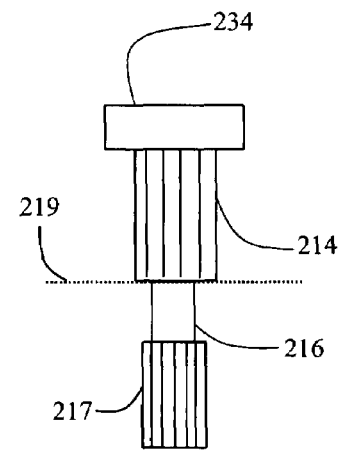
FIG. 22　　　　　　　　　FIG. 24
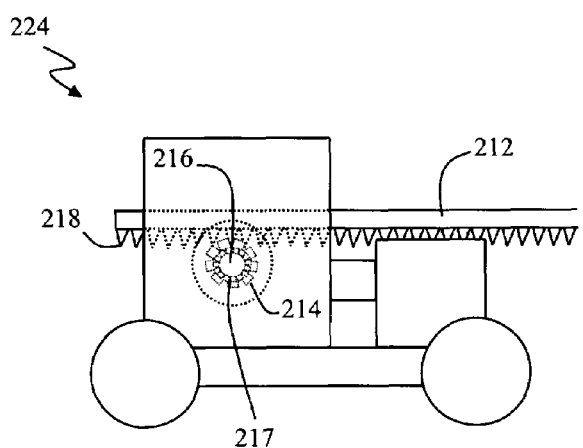
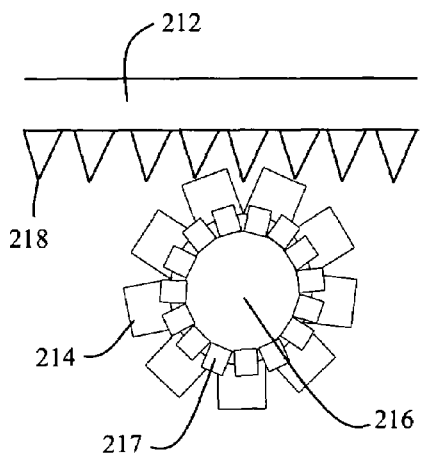
FIG. 23　　　　　　　　　FIG. 25

SYSTEM AND METHOD FOR GENERATING ELECTRICAL ENERGY USING A FLOATING DOCK

CROSS REFERENCES TO RELATED APPLICATIONS

The present application is a nonprovisional patent application claiming benefit under 35 U.S.C. § 119(e) from U.S. Provisional Application Ser. No. 60/849,420, filed on Oct. 4, 2006, the entire contents of which are hereby expressly incorporated by reference into this disclosure as if set forth fully herein.

BACKGROUND OF THE INVENTION

I. Field of the Invention

The present invention relates generally to the field of electrical energy production. In particular, the disclosed system and associated methods relate to the field of converting the mechanical energy generated from the motion of a body of water into electrical energy.

II. Discussion of the Prior Art

Waves contain vast amounts of mechanical energy, and converting the mechanical energy from waves into electrical energy is a challenging but potentially very rewarding task. Electricity production from wave energy provides a method of clean and cost efficient energy, which is becoming increasingly relevant as the current energy crises expands.

Many methods of alternative energy production are known in the art, for example solar and wind generators. Generally speaking, however, existing wave energy generators are less effective and more infrequently used than their solar and wind counterparts. Existing wave energy conversion systems generally involve tethering a floating apparatus to a generator apparatus affixed to the ocean floor. As the waves move the floating apparatus vertically, the mechanical energy is transferred via gas or fluid-coupled systems to the generator apparatus.

Existing wave energy conversion systems are large and difficult to construct, presenting problems of both cost and practicality. As previously mentioned, many of the existing wave energy conversion systems involve tethering a floating apparatus to a generator apparatus which is secured to the ocean floor, a difficult and costly process in itself. Not only is this type of system difficult and costly to build, it also poses a safety hazard in that large and dangerous mechanical processes are engaged under water, and thus outside the vision of passersby. Therefore, to avoid dangerous contact with passersby, the systems must be constructed far from shore. This not only exacerbates the cost of the system, but also does not entirely solve the problem of underwater collisions. These systems further complicate, and become more costly, because the means of extracting electrical energy employs complex gas or fluid-coupled generator systems. Additionally, these systems are not designed to accommodate and employ pre-existing structures, thus they must be constructed and mounted from scratch.

The present invention is directed at eliminating, or at least reducing, the effects of the shortcomings of the prior art systems as described above.

SUMMARY OF THE INVENTION

The present invention accomplishes this goal by providing an energy converting system and method using a floating dock generator, which may attach in a relatively simple and cost efficient manner to existing floating docks without creating the underwater safety hazards of the prior art. According to one broad aspect of the present invention, the energy converting system is comprised of a translating generator assembly which interacts with the traditional components of a floating dock system: a pier head, a dock ramp, and a floating dock. The translating generator assembly rests upon the floating dock, and moves laterally as the floating dock moves vertically in relation to the water level. The dock ramp extends from the roller system to the pier head, and pivots on a point to accommodate the vertical fluctuation of the water level. The generator contains a generator axle, which is rigidly affixed to the generator cogs. As water levels fluctuate vertically, the translating generator assembly moves horizontally. This horizontal movement is converted, by different mechanisms in different embodiments, into rotational movement of the generator axle and thus the generator cogs. The rotation of the generator cogs completes the conversion from mechanical wave energy into electrical energy, as the generator uses electromagnetic materials to convert the mechanical rotation of the generator axle into electric current.

The generator may include any number of components capable of converting the mechanical energy of the rotating generator axle into electrical energy. By way of example only, the generator may include a Faraday-type generator, any sort of dynamo, or any type of alternator.

BRIEF DESCRIPTION OF THE DRAWINGS

Many advantages of the present invention will be apparent to those skilled in the art with a reading of this specification in conjunction with the attached drawings, wherein like reference numerals are applied to like elements and wherein:

FIG. 5 is a side view of the translating generator apparatus of a system for generating electrical energy using a floating dock according to a first preferred embodiment of the present invention.

FIG. 6 is a top view of the generator axle of the translating generator apparatus of a system for generating electrical energy using a floating dock according to a first preferred embodiment of the present invention.

FIG. 7 is a top view of the translating generator apparatus of a system for generating electrical energy using a floating dock according to a first preferred embodiment of the present invention.

FIG. 8 is a top view of the attachment apparatus of the translating generator apparatus of a system for generating electrical energy using a floating dock according to a first preferred embodiment of the present invention.

FIGS. 9, 10, and 11 are side views of the attachment apparatus of the translating generator apparatus of a system for generating electrical energy using a floating dock according to a first preferred embodiment of the present invention.

FIG. 22 is a top view of the translating generator apparatus of a system for generating electrical energy using a floating dock according to a third preferred embodiment of the present invention.

FIG. 23 is a side view of the translating generator apparatus of a system for generating electrical energy using a floating dock according to a third preferable embodiment of the present invention.

FIG. 24 is a top view of the generator axle assembly of a system for generating electrical energy using a floating dock according to a third preferable embodiment of the present invention.

FIG. 25 is a side view of the lever arm and generator axle assembly of a system for generating electrical energy using a floating dock according to a third preferable embodiment of the present invention.

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The wave energy conversion system disclosed herein boasts a variety of inventive features and components that warrant patent protection, both individually and in combination.

Figure 1:
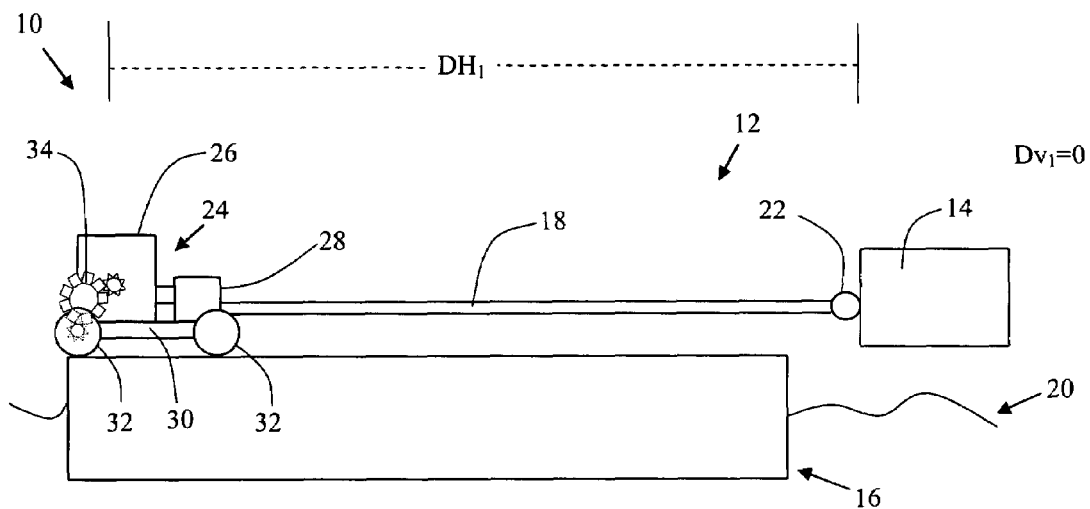
FIG. 1 is a side view of a system for generating electrical energy using a floating dock (at a first vertical position) according to a first preferred embodiment of the present invention.
Figure 2:
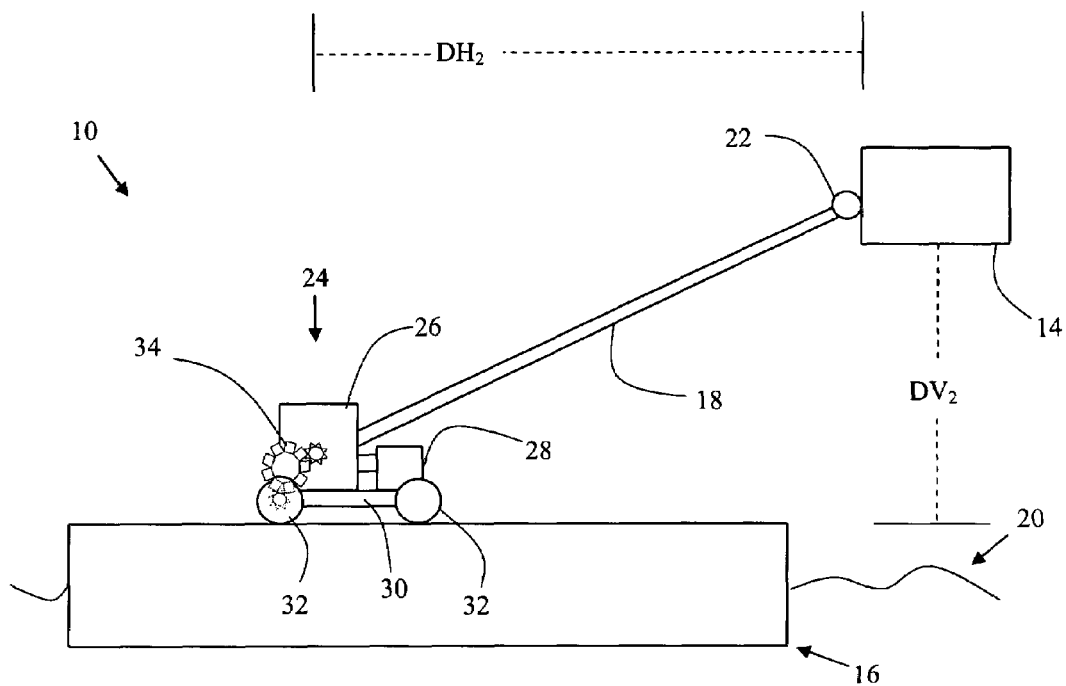
FIG. 2 is a side view of a system for generating electrical energy using a floating dock (at a second vertical position) according to a first preferred embodiment of the present invention.

FIGS. 1-2 are side views of a water energy conversion system 10 according to a first preferred embodiment of the present invention for use with a traditional floating dock system 12 (including a pier head 14, floating dock 16 and dock ramp 18) to convert water energy to electrical energy based on variations in the level (height) of a body of water 20. The floating dock system 12 is typical of that found in most marinas in areas with variances in the level of the water 20 due to, for example, tidal influences and/or waves. The pier head 14 is in a fixed vertical location, while the floating dock 16 is capable of moving upwards or downwards depending upon the level of the water 20. The ramp 18 serves as a walkway for individuals wishing to traverse between the pier head 14 and the floating dock 16. To accomplish this in the face of the variations in the level of the water 20, the ramp 18 is hingedly coupled to the pier head 14 at its proximal end via a pier head pivot 22 and is capable of translating horizontally relative to the floating dock 16. As the water 20 level decreases, the vertical distance (DV) between the pier head 14 and floating dock 16 increases (e.g. from DV1 of FIG. 1 to DV2 of FIG. 2), while the horizontal distance (DH) between the pier head 14 and the distal end of the ramp 18 decreases (e.g. from DH1 in FIG. 1 to DH2 in FIG. 2). The converse is true when the water level increases, with the DV decreasing (e.g. from DV2 in FIG. 2 to DV1 in FIG. 1) and the DH increasing (e.g. from DH2 in FIG. 2 to DH1 in FIG. 1).

The water energy conversion system 10 of the present invention capitalizes on the operation of the floating dock system 12 by providing a translating generator assembly 24 coupled to the distal end of the ramp 18 by a swiveling attachment apparatus 25 (not shown), and comprising a generator 26, a battery 28, a platform 30, and rollers 32. As the water 20 level rises and falls, and the angle between the dock ramp 18 and floating dock 12 changes, the rollers 32 allow the translating generator assembly 24 to move laterally along the surface of the floating dock 12. This translating generator assembly 24 serves to convert the mechanical energy of the rising and falling of the water 20 into electrical energy. According to a first embodiment (FIGS. 1-11), this is accomplished by providing a gear system 34 to convert the mechanical energy of the translating generator assembly 24 into electrical energy.

Figure 3:
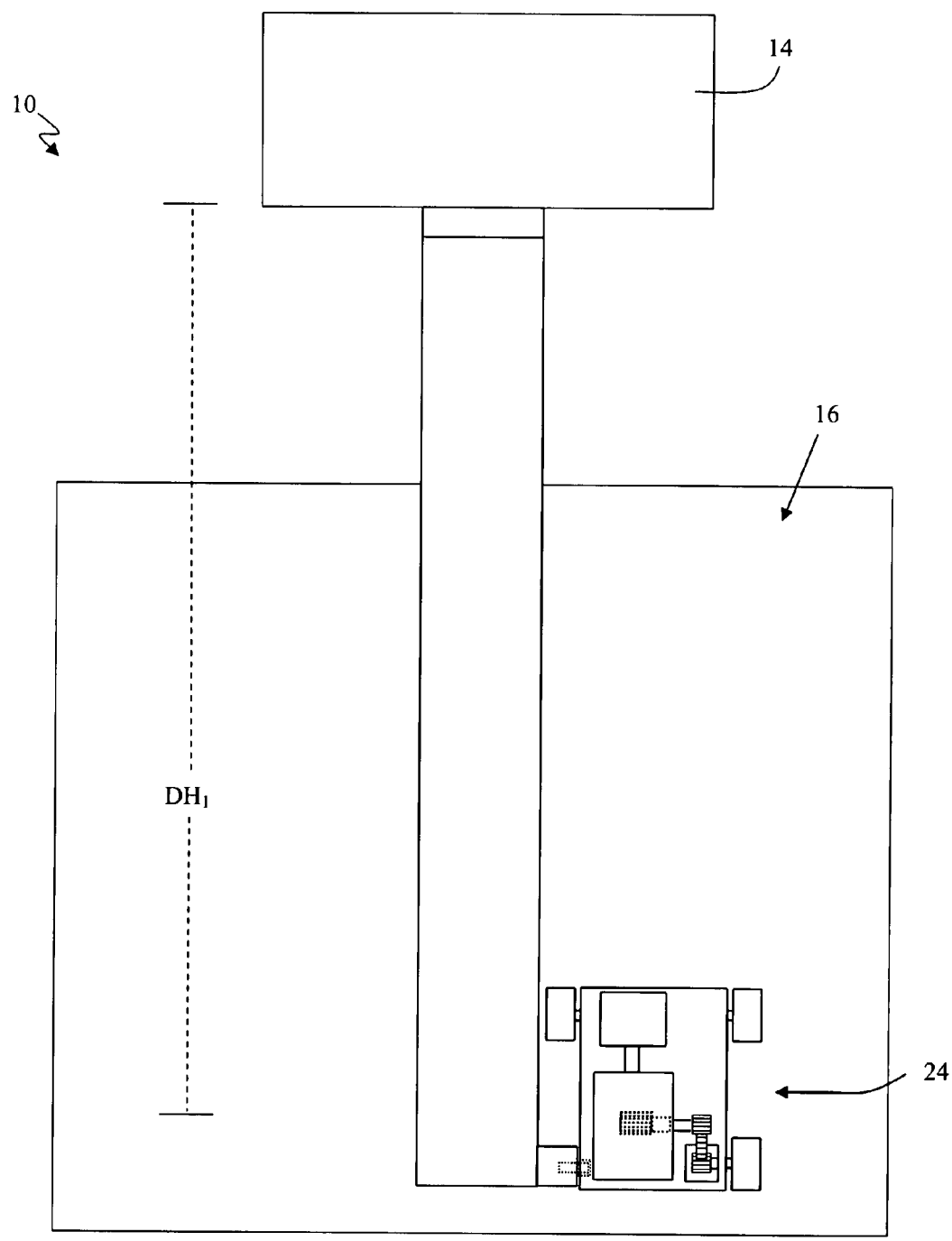
FIG. 3 is a top view of a system for generating electrical energy using a floating dock (at the first vertical position shown in FIG. 1) according to a first preferred embodiment of the present invention.
Figure 4:
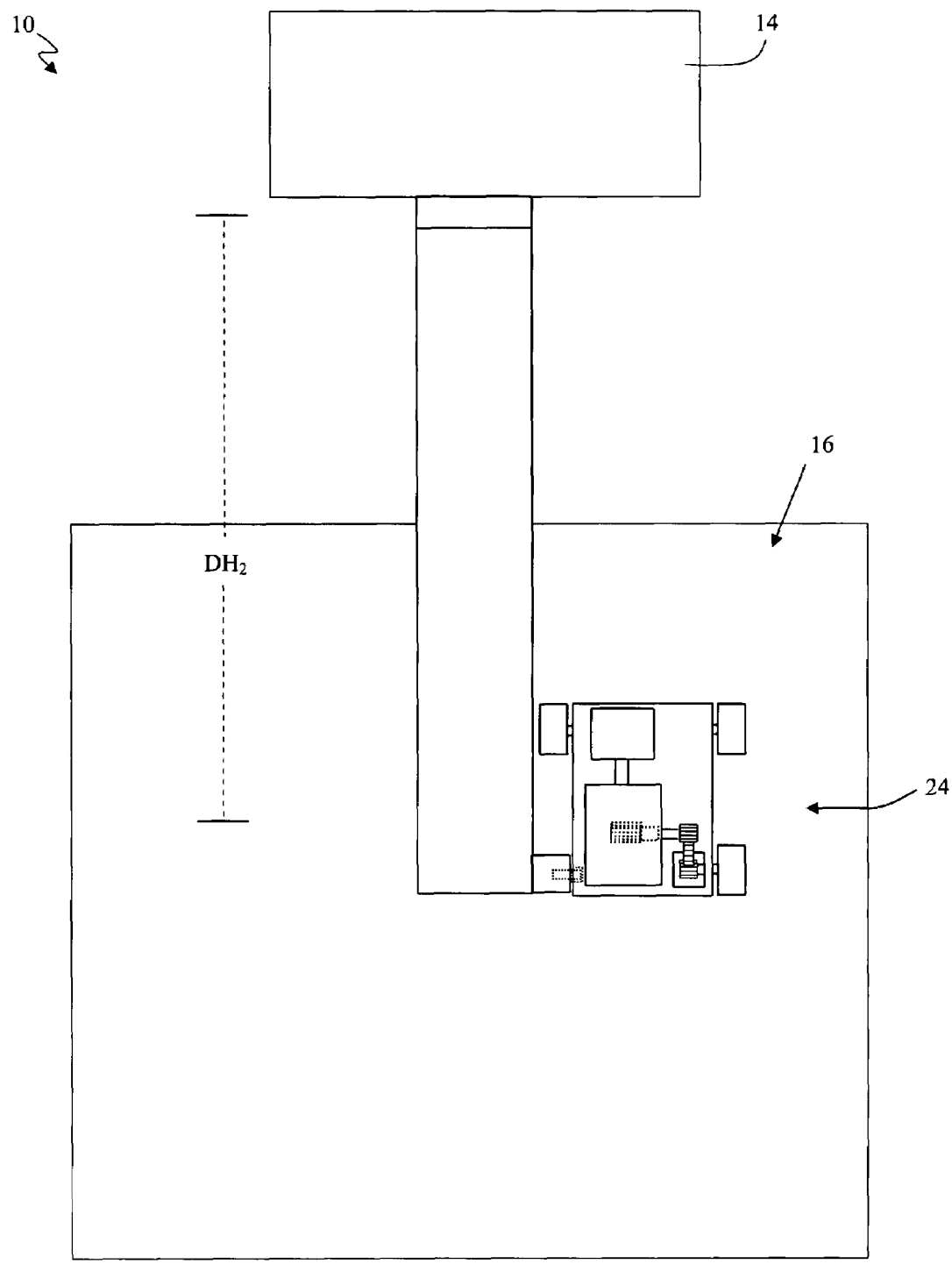
FIG. 4 is a top view of a system for generating electrical energy using a floating dock (at the second vertical position shown in FIG. 2) according to a first preferred embodiment of the present invention.

FIGS. 3 and 4 depict a top view of the energy conversion system 10, with the translating generator assembly 24 located at the same vertical locations found in FIGS. 1 and 2, respectively. Thus FIG. 3 represents the high water mark, and the translating generator apparatus is located at the distal end of the floating dock 16 (in relation to the pier head 14)—thereby resulting in the large DH1. Correspondingly, FIG. 4 represents a lower water mark, and thus the translating generator assembly 24 is located at a more proximal position on the floating ramp 16—thereby resulting in the smaller DH2.

As best shown in FIG. 5, the gear system 34 comprises a roller axle gear 36, an intermediate gear 38, and a generator axle gear 40. The gear system 34 is engaged at one terminus by the roller axle 42 and at the other terminus by the generator axle 44. As the most distal roller 32 and roller axle 42 turn, the roller axle gear 36 engages the intermediate gear 38, which in turn engages the generator axle gear 40. The rotation of the generator axle gear 40 corresponds to the rotation of the generator axle 44, and in turn the generator cogs 46. The rotation of the generator cogs 46 inside the generator 26 completes the conversion of the mechanical energy into electrical energy, as the generator 26 uses electromagnetic materials to convert the mechanical rotation of the generator cogs 46 into electric current. This electric current may then pass from the generator 26 to the battery 48 via the battery connector 50. The electrical energy may then be stored in the battery 48 until it is needed for powering electrical devices. It must also be appreciated that the battery 48 is not an integral part of this system, and that one skilled in the art may devise a more direct system of powering electrical devices, negating the need for a battery.

The details of the inner workings of the generator 26 are well known in the art, and are thus not relevant to this description. It is clear that one skilled in the art can envision any variety of generator 26 that is capable of converting the mechanical rotation of the generator cogs 46 into electric current. Similarly, the details of batteries 48 are well known to those skilled in the art, and it is sufficient to state that the battery merely consist of any device capable of storing an electric charge until it is needed. The battery connector 50 serves as a conduit between the generator 26 and the battery 48, and allows for the controlled transfer of electricity between the two. As such, one skilled in the art can envision any number of devices (including but not limited to a common copper wire) capable of serving such a purpose.

FIG. 6 depicts a top view of the generator axle 44. The generator axle 44 is rigidly affixed at one end to the generator axle gear 40, and at the other end to the generator cogs 46. Thus the rotation of the generator axle gear 40 is directly coupled to the rotation of the generator cogs 46 via the generator axle 44. The dotted line in FIG. 6 represents the outer wall of the generator 26, which the generator axle 44 may pass through via a circular, or any other shaped, opening.

FIG. 7 is a top view of the translating generator assembly 24, and best depicts the spatial relationship of the gear system 34. As shown, the roller axle gear 36 is rigidly affixed to the roller axle 42 of the most distal roller 32. As the water 20 level (not shown) fluctuates vertically, and the translating generator apparatus 24 moves horizontally, the rollers 32 rotate. The rotation of the most distal roller 32 causes the rotation of the most distal roller axle 42, and thus the rotation of the roller axle gear 36. As indicated, the platform 30 contains a gear system aperture 52 which allows the roller axle gear 36 to pass through the platform 30 and engage the intermediate gear 38. The rotation of the intermediate gear 38 causes the generator axle gear 40 to rotate, which in turn causes the generator axle 44 and generator cogs 46 to rotate. The rotation of the generator cogs 46 completes the conversion of mechanical energy into electrical energy via the electromagnetic materials inside the generator 26. Also depicted in FIG. 7 is a preferable location and embodiment of an attachment apparatus 54, which serves to connect the dock ramp 18 (not shown) to the platform 30 of the translating generator assembly 24.

FIG. 8 depicts a top view, and FIGS. 9-11 side views, of the attachment apparatus 54. Because the dock ramp 18 is constantly changing angle relative to the floating dock 16, owing to the vertical movement of the floating dock 16 and the horizontal movement of the translating generator assembly 24, the attachment apparatus 54 must be able to accommodate this fluctuating angle. According to one embodiment of the present invention, the attachment apparatus 54 performs this function by being rigidly affixed to the dock ramp 18 and attached by a swivel 56 to the platform 30 of the translating generator assembly 24. Thus as the angle of the ramp 18 in relation to the floating dock 16 changes, the attachment apparatus 54 moves with the ramp 18, while the platform 30 maintains its level vertical position. FIG. 9 depicts the approximate angle created by the water 20 level in FIG. 1; FIG. 10 depicts an approximate angle created by an intermediate water 20 level; and FIG. 11 depicts the approximate angle created by the water 20 level of FIG. 2.

According to a second embodiment of the present invention (FIGS. 12-17), the water energy conversion system 110 employs a lever arm assembly 112 (in place of the gear system 34) to convert the mechanical energy of fluctuating water 113 levels into electrical energy. This embodiment employs a lever arm 114 extending between the translating generator assembly 116 and a location on the ramp 118. A first end 120 of the lever arm 114 is flexibly coupled to the ramp 118 via the lever arm attachment device 122 (and does not translate longitudinally relative to the dock 124), while a second end 126 of the lever arm 114 translates longitudinally relative to, and cooperates with, various mechanical components of the translating generator assembly 116 to generate electrical energy as the floating dock 124 moves vertically in the water 113.

Figure 12:
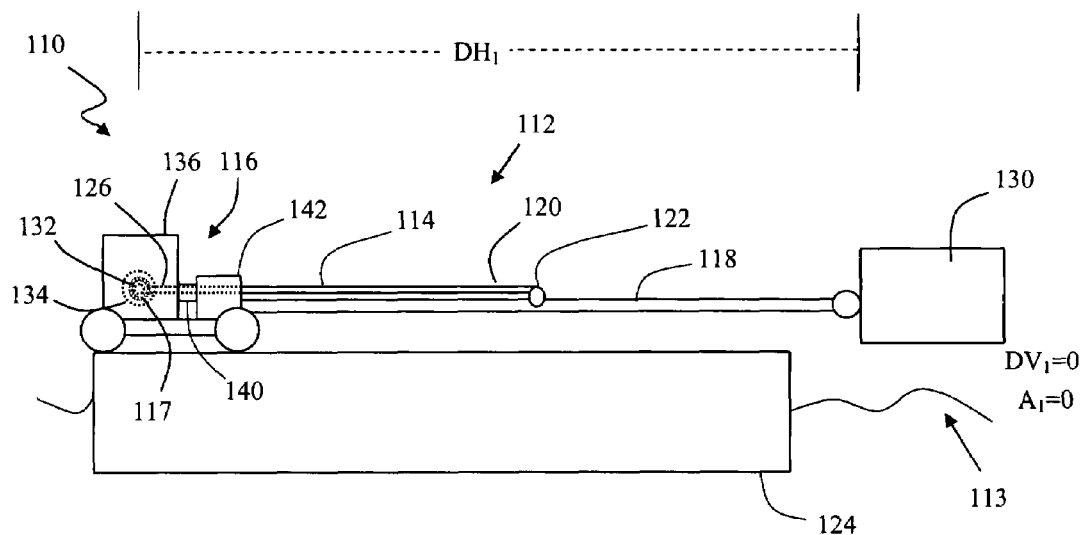
FIG. 12 is a side view of a system for generating electrical energy using a floating dock (at the first vertical position shown in FIG. 1) according to a second preferred embodiment of the present invention.

FIGS. 12-15 correspond to the water 113 levels, and translating generator 116 positions, of FIGS. 1-4, respectively. Thus, FIG. 12 depicts the high water position of FIGS. 1 and 3, and the translating generator assembly 116 is located at the end of the floating dock 124 away from the pier head 130. The dashed lines of the lever arm 114, generator axle 132, and generator axle cap 134 indicate that they are located behind the generator 136 and thus outside of view at this perspective. As the water 113 level fluctuates vertically, the translating generator assembly 116 moves horizontally and parallel to the surface of the floating dock 124. $DV_1$ represents the vertical distance from the pier head 130 to the surface of the water 113. $DH_1$ represents the horizontal distance from the pier head 130 to the generator axle 132. A represents the angle between the lever arm 114 and the surface of the floating dock 124. Thus, as the water 113 level rises DV decreases and DH increases, as effectuated by the horizontal movement of the translating generator assembly 116, and angle A decreases.

Figure 13:
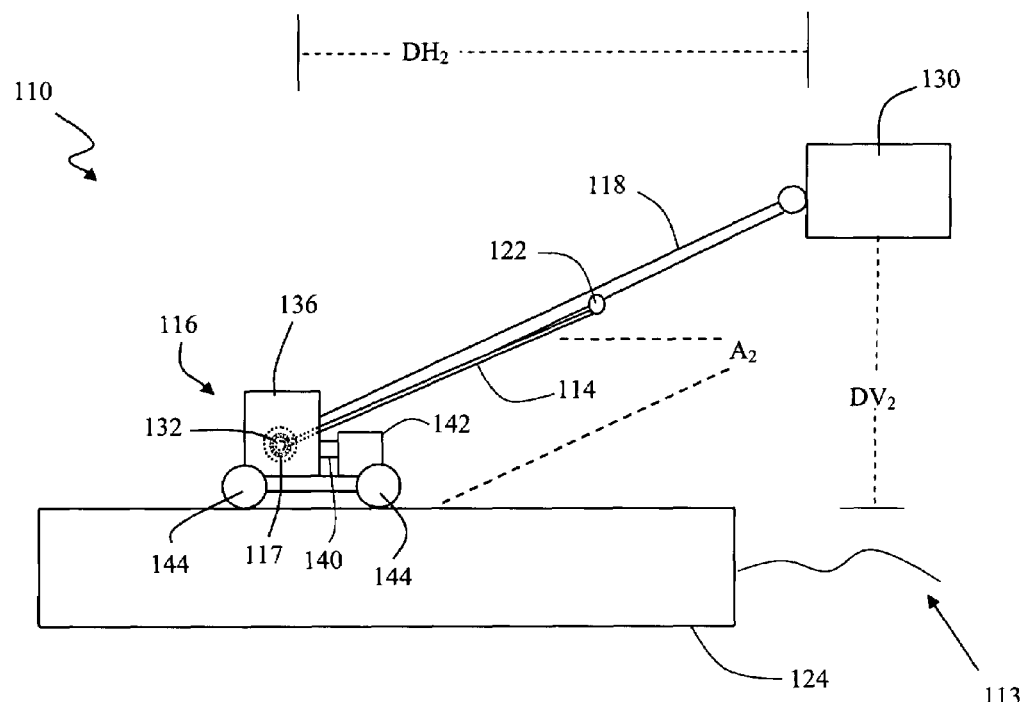
FIG. 13 is a side view of a system for generating electrical energy using a floating dock (at the second vertical position shown in FIG. 2) according to a second preferred embodiment of the present invention.

In this embodiment the rotation of the generator cogs 117, and corresponding conversion of mechanical energy into electrical energy, is accomplished via the lever arm assembly 112. As depicted in FIGS. 12 and 13, the lever arm 114 is flexibly coupled to the dock ramp 118 at one end 120 by the lever arm attachment device 122, and at the other end 126 rigidly attached to the generator axle 132. The lever arm attachment device 122 serves to accommodate the non-parallel movement of the lever arm 114 and the dock ramp 118, by allowing the proximal end 120 of the lever arm 114 to vary in lateral position relative to the ramp 118 as well as accommodating the differing and variable angles of the two objects.

As such, the lever arm attachment device 122 may comprise any sort of sliding or springing device capable of performing such a function. Thus as the water 113 level fluctuates vertically, and the angle $A_1$ increases or decreases correspondingly, the lever arm 114 causes the generator axle 132 to rotate. Just as in the first embodiment, the revolution of the generator axle 132 effectuates the revolution of the generator cogs 117, which in turn completes the conversion of mechanical wave energy into electrical energy. The electric current may then pass through the battery connector 140 and into the battery 142 for storage, just as in the first embodiment.

FIG. 13 is shown to be a replication of FIG. 12 and includes all embodiments and combinations contained therein, albeit altered in response to the vertical fluctuation of water 113. As distance $DV_2$ has increased, the rollers 144 have allowed the translating generator assembly 116 to move horizontally, and thus closer to the pier head 130 relative to FIG. 12. This shift has decreased distance $DH_2$, and in turn increased the angle $A_2$ relative to FIG. 12. The dock ramp 118 has pivoted downward to accommodate this shift, and the lever arm 114 has changed position in relation to the generator axle 132. As the lever arm 114 is affixed to the generator axle 132, the generator axle 132 thereby rotates. This rotation in turn effectuates the rotation of the generator cogs 117, and again the mechanical energy is converted into electrical energy by the generator 136.

Figure 14:
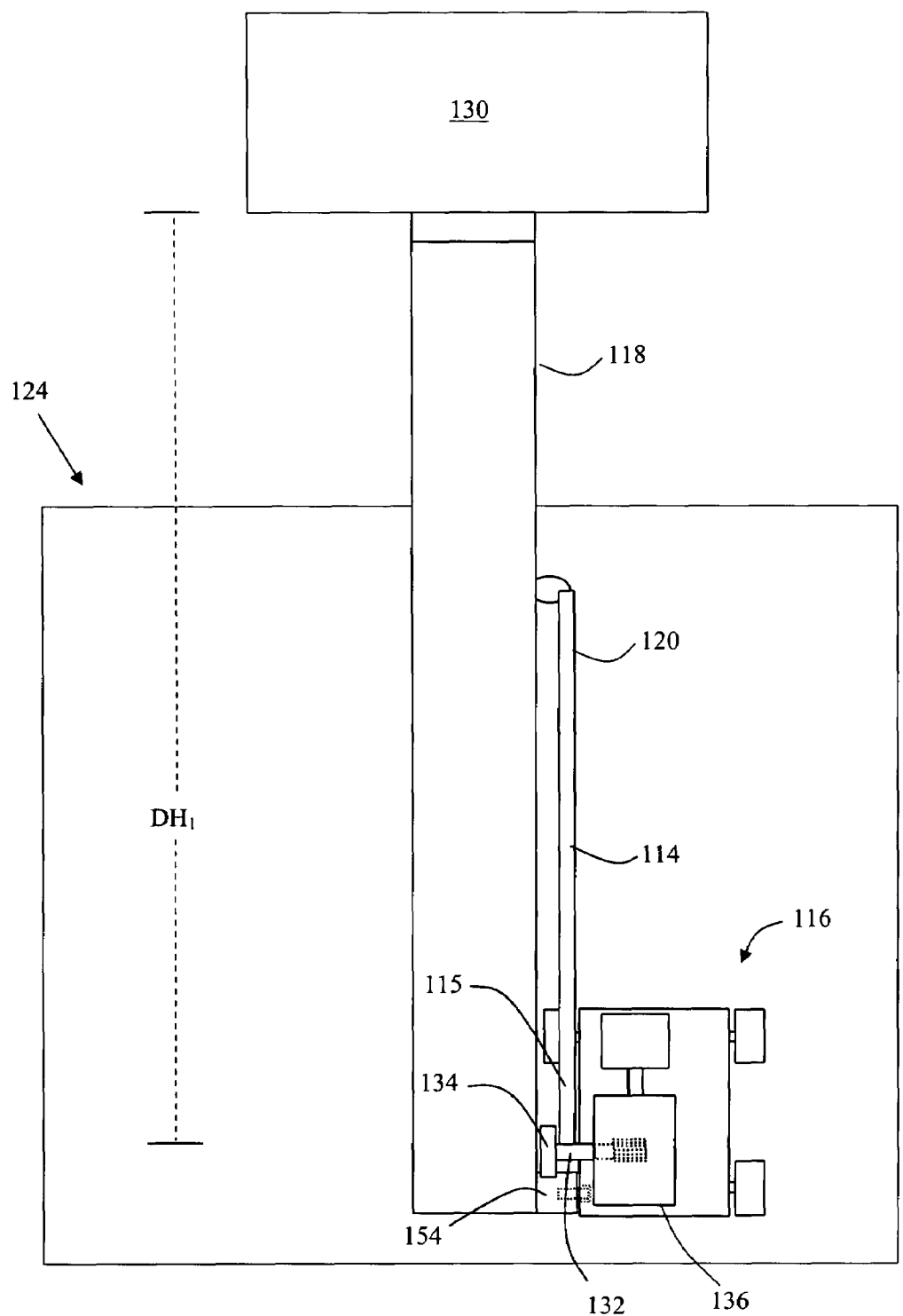
FIG. 14 is a top view of a system for generating electrical energy using a floating dock (at the first vertical position shown in FIG. 1) according to a second preferred embodiment of the present invention.
Figure 15:
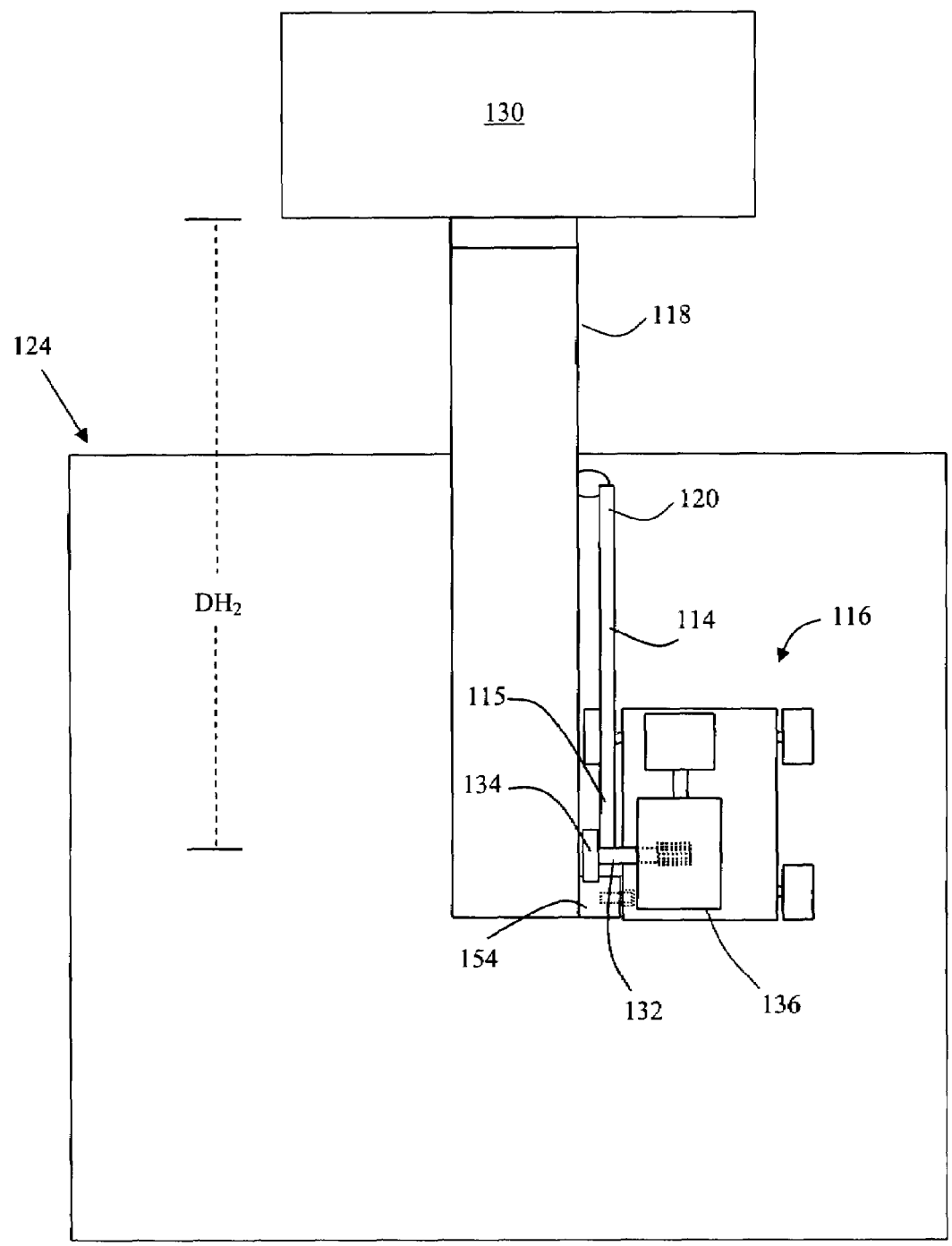
FIG. 15 is a top view of a system for generating electrical energy using a floating dock (at the second vertical position shown in FIG. 2) according to a second preferred embodiment of the present invention.

FIGS. 14 and 15 depict top views of the energy conversion assembly 110 at the water 113 levels found in FIGS. 12 and 13 (and FIGS. 1 and 2) respectively. FIGS. 14 and 15 better depict the interaction between the lever arm 114 and generator axle 132. The lever arm 114 is rigidly affixed to the generator axle 132, thus as the distal end 115 of the lever arm varies in vertical position relative to the generator axle 132, and angle A changes (not shown), the generator axle 132 rotates. Again, the rotation of the generator axle 132 results in the rotation of the generator cogs 117, and the subsequent conversion of mechanical energy into electrical by the generator 136. Also shown is the generator axle cap 134, which serves to stabilize and protect the exterior surface of the generator axle 132, as well as prevent human contact with potentially dangerous rotating parts. As such, one skilled in the art can envision any number of devices capable of performing this function. Further depicted is the attachment apparatus 154 which is composed in the same manner as in the previous embodiment, and serves the same purpose.

Figure 16:
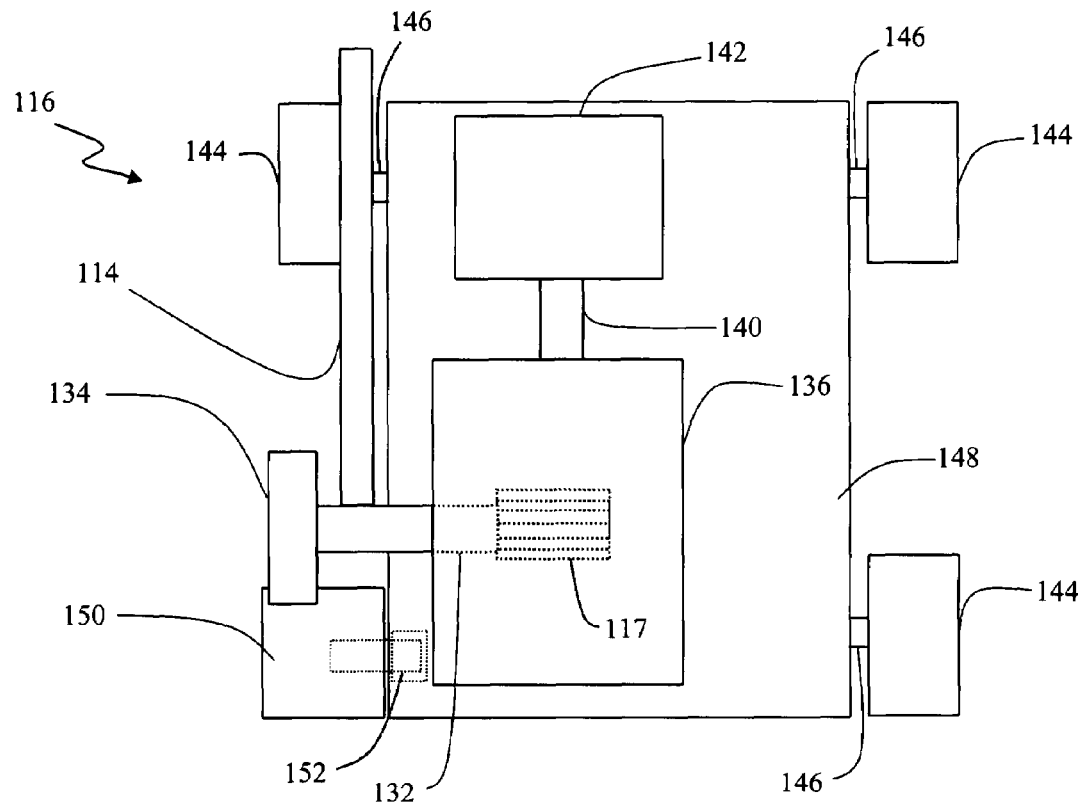
FIG. 16 is a top view of the translating generator apparatus of a system for generating electrical energy using a floating dock according to a second preferred embodiment of the present invention.

FIG. 16 is a top view of a preferred embodiment of the translating generator apparatus 116. The lever arm 114 is rigidly affixed to the generator axle 132, providing for the vertical movement of the water to result in rotation of the generator axle 132. The generator axle cap 134 serves to stabilize and protect the external surface of the generator axle 132. The roller axles 146 attach to the rollers 144 and facilitate their rolling motion, which allows the platform 148 to move parallel to the floating dock 124 (not shown in this figure). The battery connector 140 serves as an electrical conduit to accommodate the flow of electricity from the generator 136 to the battery 142 for storage. FIG. 16 also best depicts the positioning of the attachment apparatus 150 which is identical to, and serves the same function, as the attachment apparatus 54 found in FIGS. 8-11 of the first embodiment. Specifically, the attachment apparatus 150 is rigidly affixed to the dock ramp 118 (not shown) and attached by a swivel 152 to the platform 148 of the translating generator assembly 116.

Figure 17:
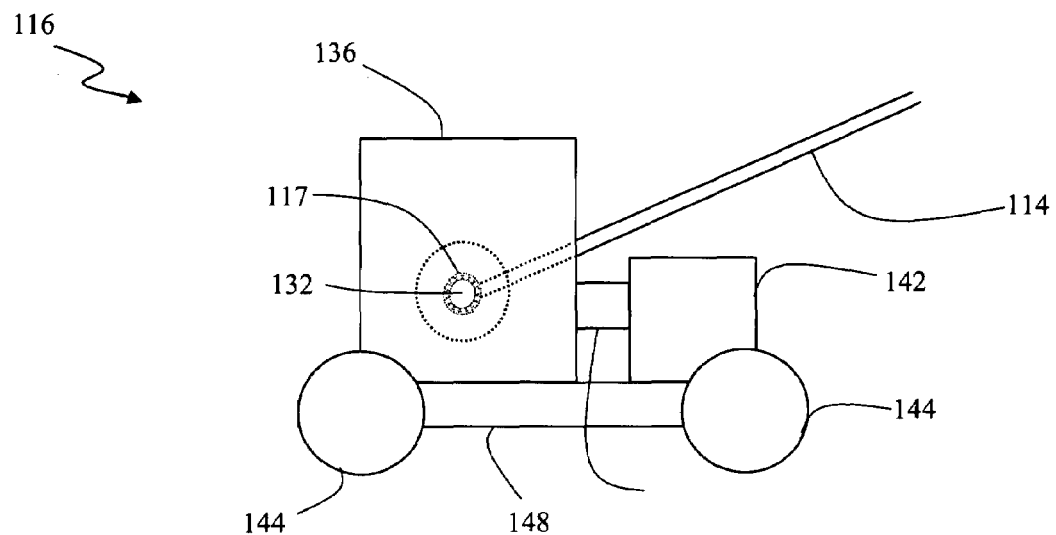
FIG. 17 is a side view of the translating generator apparatus of a system for generating electrical energy using a floating dock according to a second preferred embodiment of the present invention.

FIG. 17 is a side view of the preferable translating generator apparatus 116 of FIG. 16. Shown are the platform 148, which serves to stabilize and support the generator 136 and battery 142, and rollers 144 which provide for the horizontal movement of the translating generator apparatus 116. Additionally depicted is a preferable relationship between the lever arm 114, generator axle 132, and generator cogs 117—in that the lever arm 114 is affixed to, and causes the rotation of the generator axle 132, which in turn rotates the generator cogs 117.

A third embodiment of the present wave energy conversion system 210 is depicted in FIGS. 18-25. This embodiment also employs a lever arm 212, which is rigidly affixed to the floating dock 213. The lever arm 212 of this embodiment functions to turn the generator axle gear 214, and thus the generator axle 216 and generator cogs 217, via a contact mechanism 218. The rest of the wave energy conversion system 210 operates in the same manner as the previous embodiment, employing the use of a lever arm 212 to convert the vertical motion of fluctuating water 220 levels into electrical energy via the revolution of generator cogs 217 inside a generator 219. The only difference between this embodiment and the previous two is the manner in which the generator cogs 217 are rotated.

Figure 18:
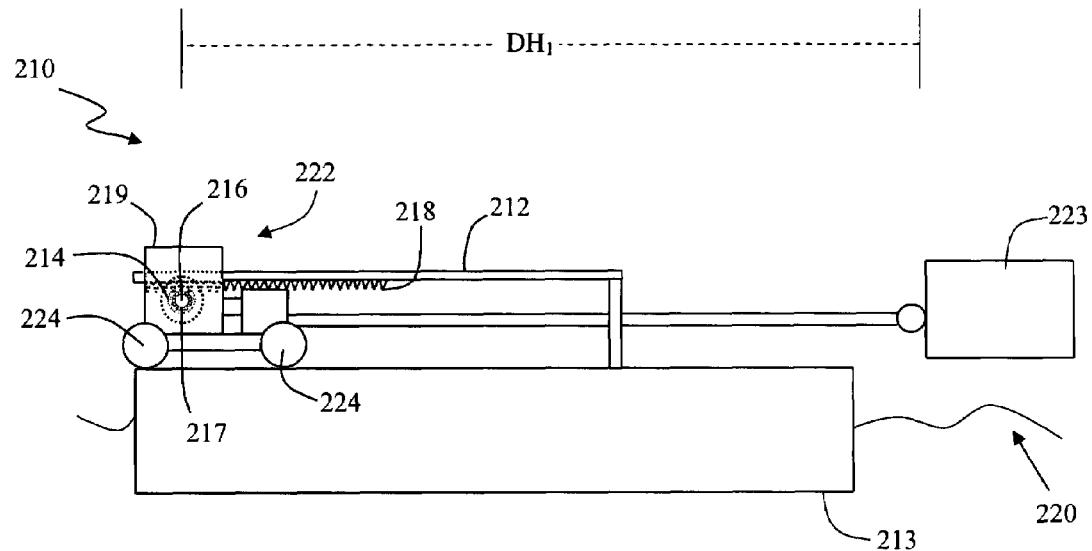
FIG. 18 is a side view of a system for generating electrical energy using a floating dock (at the first vertical position shown in FIG. 1) according to a third preferred embodiment of the present invention.
Figure 19:
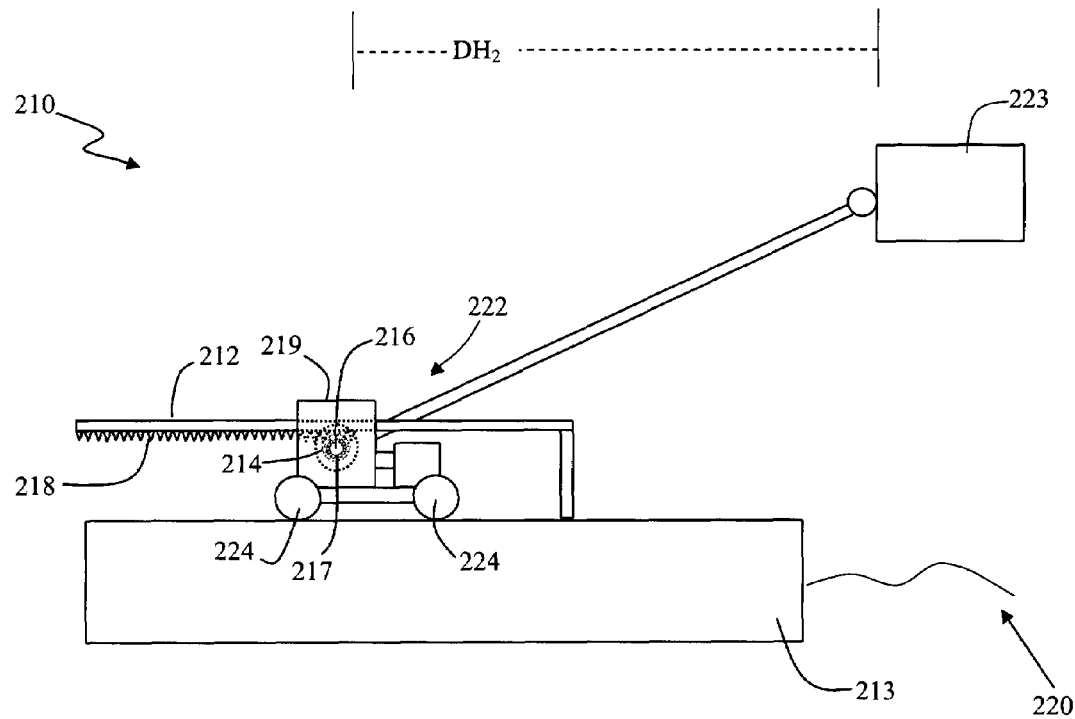
FIG. 19 is a side view of a system for generating electrical energy using a floating dock (at the second vertical position shown in FIG. 2) according to a third preferred embodiment of the present invention.

FIGS. 18 and 19, which correspond to the water 220 levels found in FIGS. 1 and 2 respectively, depict a side view of the translating generator assembly 222 of the present invention. The contact mechanism 218 of the lever arm 212 serves to cause the rotation of the generator axle gear 214, and may comprise numerous grooves or teeth, triangular or otherwise, which interact with corresponding grooves on the generator axle gear 214. However, one skilled in the art may devise any number of possible interacting combinations which would serve the same purpose of translating the movement of the translating generator assembly 222 into the rotation of the generator axle gear 214. The lever arm 212 may be rigidly affixed to the floating dock 213 at a proximal end (relative to the pier head 223) and may rest upon the generator axle 216 or may be affixed to the floating dock 213 or any other structure at a distal end, or anywhere in between. Thus, as the water 220 level fluctuates vertically, and the translating generator assembly 222 moves horizontally via the rollers 224, the generator gear 214 advances along and is turned by the contact mechanism 218. This rotation of the generator gear 214 causes the rotation of the generator axle 216 and thus the rotation of the generator cogs 217.

Figure 20:
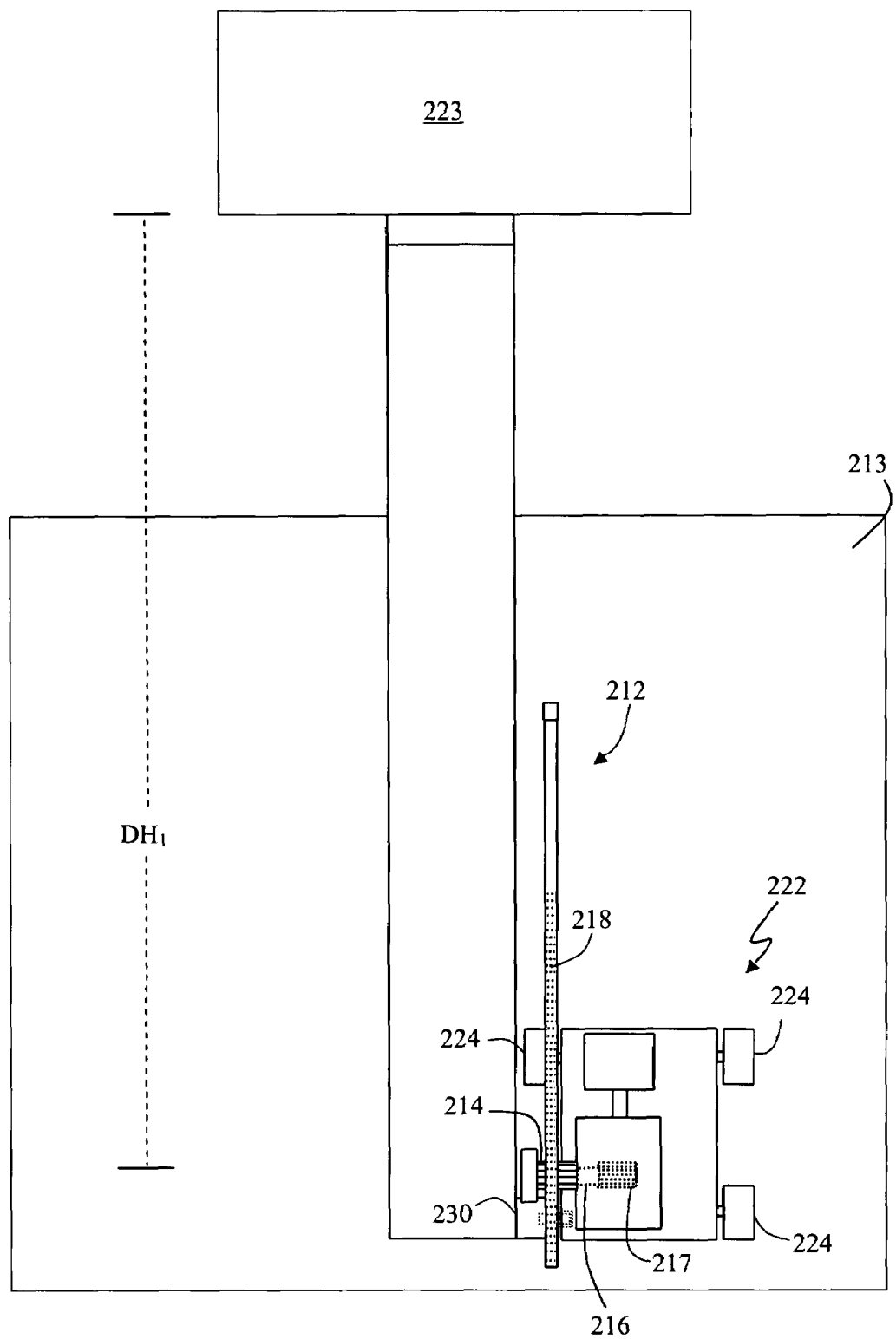
FIG. 20 is a top view of a system for generating electrical energy using a floating dock (at the first vertical position shown in FIG. 1) according to a third preferred embodiment of the present invention.
Figure 21:
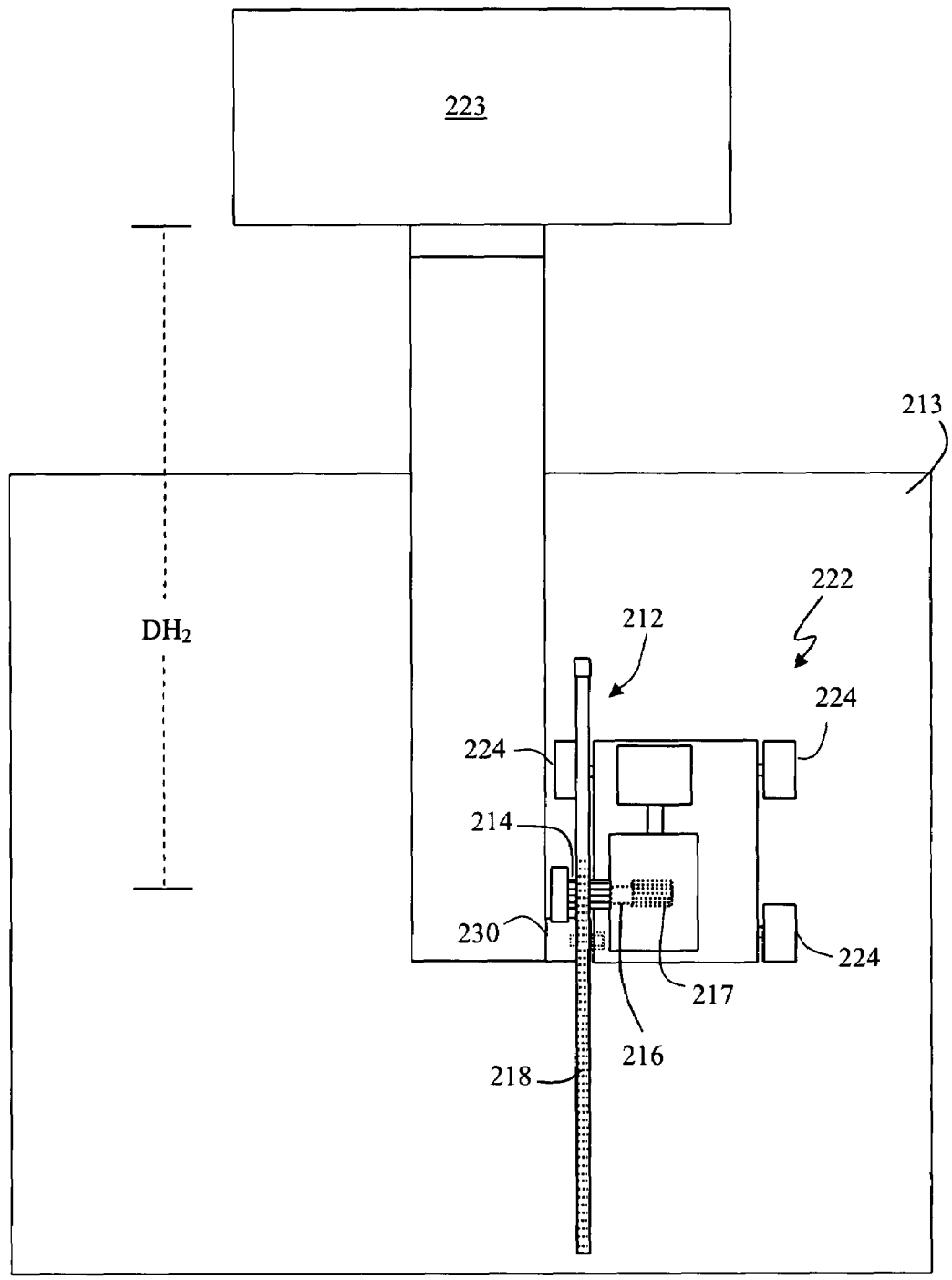
FIG. 21 is a top view of a system for generating electrical energy using a floating dock (at the second vertical position shown in FIG. 2) according to a third preferred embodiment of the present invention.

FIGS. 20 and 21 depict an overhead view of this embodiment, corresponding to the water levels found in FIGS. 18 and 19 (or FIGS. 1 and 2), respectively. Thus, $DH_1$ of the high water mark in FIG. 20 is greater than $DH_2$ of the low water mark in FIG. 21. FIGS. 20 and 21 show the stationary and detached nature of the lever arm 212 of one variation of this embodiment. The lever arm 212 remains in a stationary position on the floating dock 213 while the translating generator assembly 222 moves laterally via the rollers 224. The contact mechanism 218 of the lever arm 212 engages the generator gear 214 and causes it to rotate. As the generator gear 214 is rigidly affixed to the generator axle 216 and generator cogs 217, the rotation of the gear 214 causes them both to rotate. Also shown is the attachment device 230, which in this embodiment is composed, and functions, in the same manner as in the previous two embodiments.

FIGS. 22 and 23 depict an overhead and side view, respectively, of the translating generator assembly 222 of this embodiment. These figures most clearly show the preferable spatial positioning of the lever arm 212, generator gear 214, generator axle 216, and generator cogs 217. Again, the lateral motion of the translating generator assembly 222 (corresponding to the vertical motion of the water 220) causes the generator gear 214 to move along, and be rotated by, the contact mechanism 218 of the lever arm 212.

FIG. 24 depicts a top view of the generator axle 216, which is rigidly affixed at one end to the generator gear 214 and at the other end to the generator cogs 217. Thus the rotation of the generator gear 214 corresponds to the rotation of the generator cogs 217, and the subsequent generation of electricity. The dashed line represents the wall of the generator 219. Also depicted is the generator axle cap 234, which serves, as it did in the previous embodiment, to protect the end of the generator axle 217 and to prevent human contact with the potentially dangerous generator gear 214.

FIG. 25 depicts a side view of a preferable interaction between the contact mechanism 218 of the lever arm 212 and the generator gear 214. As shown, the contact mechanism 218 serves as a stationary contact point upon which the generator gear 214 turns as the translating generator assembly 222 (not shown) moves laterally. Also depicted is the generator axle 216 which serves to transfer the rotation movement from the generator gear 214 to the generator cogs 217.

Figure 26:
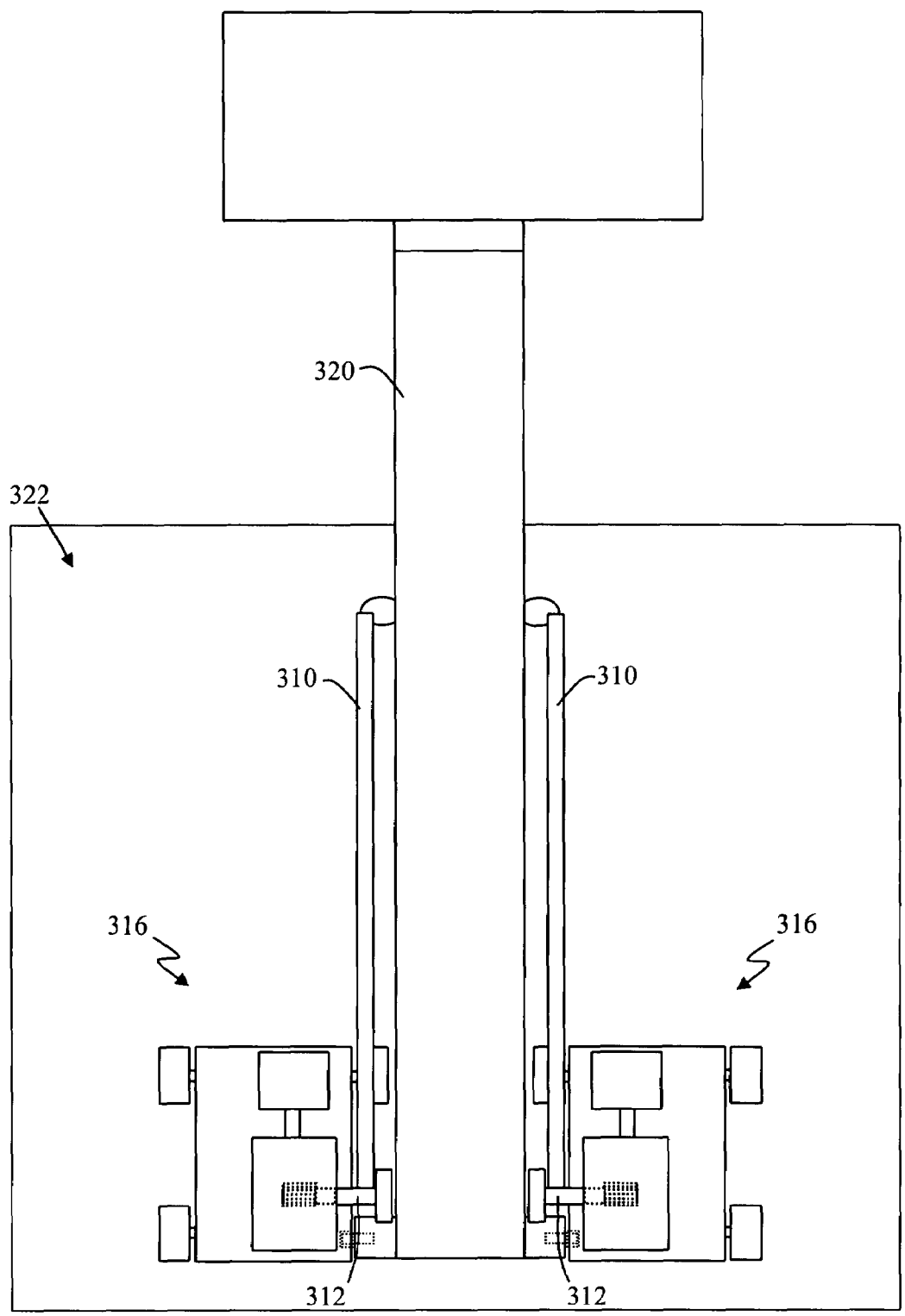
FIG. 26 is a top view of a system for generating electrical energy using a floating dock (at the first vertical position shown in FIG. 1) according to a fourth preferable embodiment of the present invention.

FIG. 26 depicts a fourth preferable embodiment of the present invention, which is identical to the second embodiment utilizing a lever arm 310 to directly rotate the generator axle 312—however, in this embodiment the lever arm assembly 314 and translating generator assembly 316 are found in duplicate. A dual generator assembly 316 embodiment may be preferable to a single generator embodiment in that more electricity may be produced from the same amount of vertical fluctuation in water level. As depicted, the dual translating generator assemblies 316 and lever arm assemblies 314 are found opposite one another, separated by the dock ramp 320, on the floating dock 322. All components function in the same manner as previously described, albeit in duplicate. Additionally, as the key functional difference between the previously disclosed embodiments is the manner in which the generator axle 312 is rotated, any of the previous preferable embodiments (or any related embodiments) may be utilized in a dual (or more) generator embodiment.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the invention is to cover all modifications, equivalents, and alternatives falling within the spirit and scope of the invention as defined herein.

What is claimed is:

1. An aquatic energy conversion system, comprising:
   an elongated structure having a first end coupled to a first structure and a second end disposed opposite from said first end;
   a generator assembly coupled to said second end of said elongated structure, said generator assembly configured to move relative to a floating second structure when said floating second structure moves vertically in response to a change in height of a body of water to convert mechanical energy from the movement of the vertical displacement of the floating second structure into electrical energy; and
   an attachment apparatus configured to couple said generator assembly to said floating second structure, wherein said attachment apparatus is rigidly affixed to said floating second structure and attached by a swivel to said generator assembly.

2. An aquatic energy conversion system, comprising:
   an elongated structure having a first end coupled to a first structure and a second end disposed opposite from said first end; and
   a generator assembly coupled to said second end of said elongated structure, said generator assembly configured to move relative to a floating second structure when said floating second structure moves vertically in response to a change in height of a body of water to convert mechanical energy from the movement of the vertical displacement of the floating second structure into electrical energy;
   wherein said generator assembly includes a generator to convert mechanical energy into electrical energy, a generator axel to deliver mechanical energy into said generator, and a transfer apparatus configured to turn said generator axel in response to a change of height of said body of water.

3. The aquatic energy conversion system of claim 1, wherein said change of height of said body of water is caused by at least one of a wave and a tide.

4. The aquatic energy conversion system of claim 1, wherein said generator assembly further includes a device for storing said electrical energy.

5. The aquatic energy conversion system of claim 4, wherein said device for storing electrical energy comprises a battery.

6. The aquatic energy conversion system of claim 1, wherein said generator assembly further includes a powering apparatus configured to power electrical devices.

7. The aquatic energy conversion system of claim 1, wherein said generator assembly further includes a conduit to allow for controlled transfer of electrical energy.

8. The aquatic energy conversion system of claim 1, further including a platform base for said generator assembly.

9. An aquatic energy conversion system, comprising:
   an elongated structure having a first end coupled to a first structure and a second end disposed opposite from said first end;
   a generator assembly coupled to said second end of said elongated structure, said generator assembly configured to move relative to a floating second structure when said floating second structure moves vertically in response to a change in height of a body of water to convert mechanical energy from the movement of the vertical displacement of the floating second structure into electrical energy;
   wherein said generator assembly further includes a plurality of rollers to allow said generator assembly to move back and forth across said floating second structure.

10. The aquatic energy conversion system of claim 9, wherein said rollers include roller axles.

11. The aquatic energy conversion system of claim 1, further including at least one more generator assembly.

12. An aquatic energy conversion system, comprising:
   an elongated structure having a first end coupled to at least one of land and a structure fixedly coupled to land, and a second end disposed opposite from said first end; and
   a generator assembly coupled to said second end of said elongated structure, said generator assembly configured to move relative to a floating dock when said floating dock moves vertically in response to a change in height of a body of water to convert mechanical energy from the movement of the vertical displacement of the floating dock into electrical energy.

13. The aquatic energy conversion system of claim 2, wherein said change of height of said body of water is caused by at least one of a wave and a tide.

14. The aquatic energy conversion system of claim 2, wherein said generator assembly further includes a device for storing said electrical energy.

15. The aquatic energy conversion system of claim 9, wherein said change of height of said body of water is caused by at least one of a wave and a tide.

16. The aquatic energy conversion system of claim 9, wherein said generator assembly further includes a device for storing said electrical energy.

17. The aquatic energy conversion system of claim 12, wherein said change of height of said body of water is caused by at least one of a wave and a tide.

18. The aquatic energy conversion system of claim 12, wherein said generator assembly further includes a device for storing said electrical energy.

19. The aquatic energy conversion system of claim 12, wherein said generator assembly further includes a powering apparatus configured to power electrical devices.

20. The aquatic energy conversion system of claim 12, wherein said generator assembly further includes a conduit to allow for controlled transfer of electrical energy.

* * * * *